United States Patent
Ono et al.

(10) Patent No.: US 7,227,992 B2
(45) Date of Patent: *Jun. 5, 2007

(54) APPARATUS AND METHOD FOR IMAGE PROCESSING AND STORAGE MEDIUM FOR THE SAME

(75) Inventors: Hiroaki Ono, Saitama (JP); Seiji Kobayashi, Tokyo (JP); Tomoo Mitsunaga, Kanagawa (JP); Ken Nakajima, Tokyo (JP); Chikako Sano, Kanagawa (JP); Nobuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/165,710

(22) Filed: Jun. 24, 2005

(65) Prior Publication Data
US 2005/0238231 A1 Oct. 27, 2005

Related U.S. Application Data

(63) Continuation of application No. 09/970,579, filed on Oct. 4, 2001, now Pat. No. 6,996,271.

(30) Foreign Application Priority Data
Oct. 5, 2000 (JP) .......................... P2000-305588

(51) Int. Cl.
*G06K 9/00* (2006.01)

(52) U.S. Cl. ..................... 382/167; 382/169; 382/274; 358/518; 345/601

(58) Field of Classification Search ........ 382/167–169, 382/274; 358/521–522, 518, 515, 3.01, 1.9, 358/520, 504; 345/600, 589, 597, 601
See application file for complete search history.

(56) References Cited

U.S. PATENT DOCUMENTS

| | | | | |
|---|---|---|---|---|
| 5,237,402 A | * | 8/1993 | Deshon et al. | 358/520 |
| 5,489,996 A | * | 2/1996 | Oku et al. | 358/518 |
| 6,255,846 B1 | * | 7/2001 | Lee et al. | 326/39 |
| 6,766,064 B1 | * | 7/2004 | Langan et al. | 382/274 |
| 2002/0034336 A1 | * | 3/2002 | Shiota et al. | 382/274 |

* cited by examiner

*Primary Examiner*—Matthew C. Bella
*Assistant Examiner*—Ali Bayat
(74) *Attorney, Agent, or Firm*—Bell, Boyd & Lloyd LLP

(57) ABSTRACT

An apparatus and a method as well as a storage device of the present invention transform intensity levels with consideration of both features of the intensity levels in an input image and human visual characteristics, wherein the present invention includes the steps of inputting wider dynamic range digital image data, generating a histogram of intensity levels of the image data, generating a histogram equalization LUT by cumulating the histogram, generating a visual characteristics LUT with reference to the histogram equalization LUT, generating a combined LUT by combining the histogram equalization LUT and the visual characteristics LUT, and correcting the image data.

11 Claims, 9 Drawing Sheets

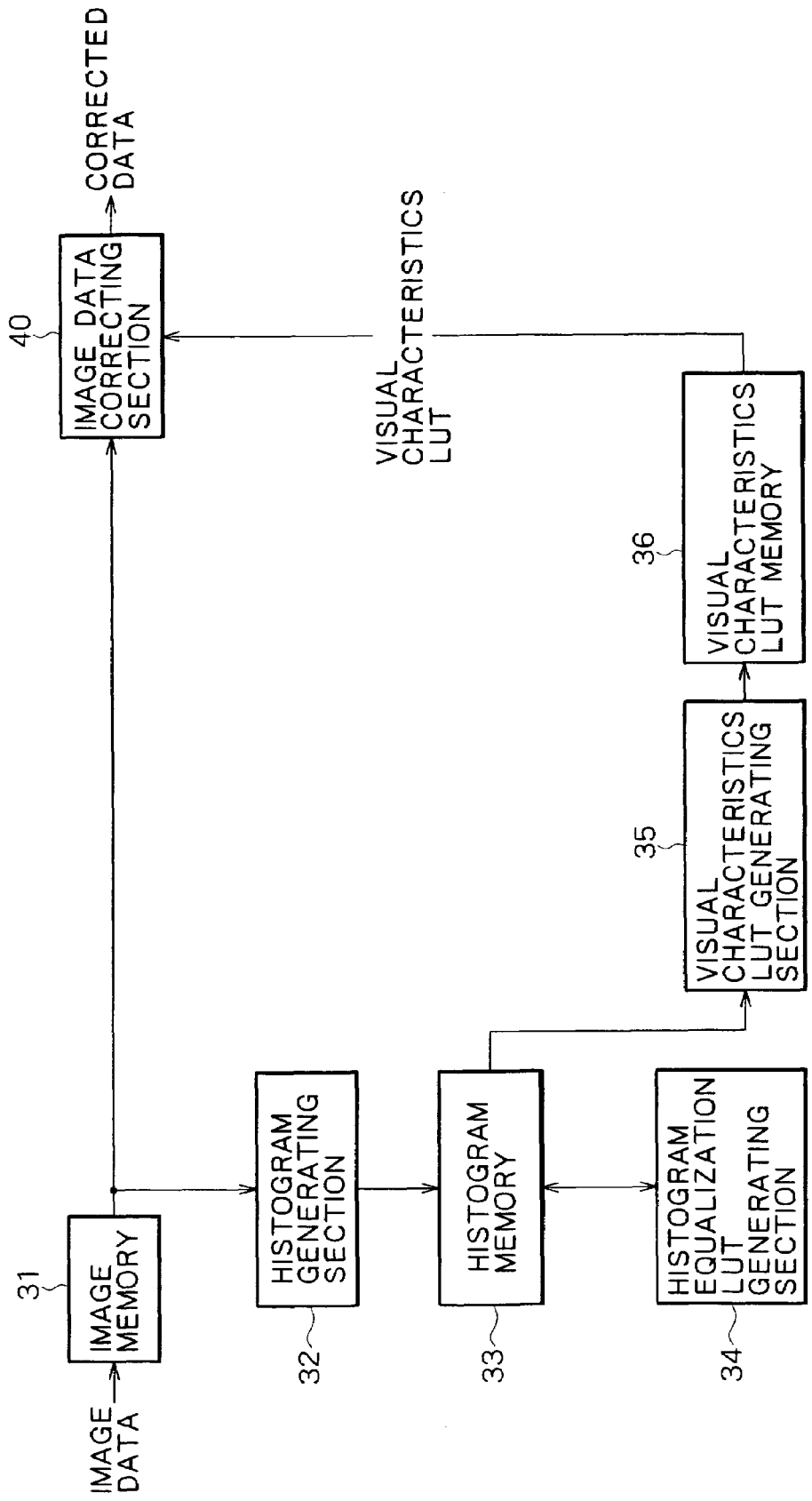

APPARATUS AND METHOD FOR IMAGE PROCESSING AND STORAGE MEDIUM FOR THE SAME

CROSS REFERENCE TO RELATED APPLICATION

The present application is a continuation of U.S. patent application Ser. No. 09/970,579 filed on Oct. 4, 2001, now U.S. Pat. No. 6,996,271 the disclosure of which is herein incorporated by reference.

BACKGROUND OF THE INVENTION

The present invention relates to an apparatus and a method for image processing as well as a storage medium for the same, and particularly to an apparatus and a method for image processing as well as a storage medium that are preferably used for transforming a dynamic range of intensity levels of pixels forming an image.

As the performance of CCDs (Charge Coupled Devices) installed in electronic apparatuses that have the ability to acquire image data, such as digital cameras, scanners and the like, has become higher, a gradation dynamic range of images tends to become wider.

However, when images having a wider gradation dynamic range than conventional one (hereinafter referred to as "wider dynamic range images") are supplied to reproducing apparatuses such as displays, printers and the like, which correspond to images having conventional dynamic range (hereinafter referred to as "narrower dynamic range images"), there is a need for a gradation correction technique that transforms the wider dynamic range images into the narrower dynamic range images.

As one of conventional gradation correction techniques, a histogram equalization method is well known. The histogram equalization method transforms pixels' intensity levels so that the intensity levels are distributed uniformly over an entire image.

A basic algorithm for the histogram equalization method will be now described. As shown in FIG. 1A, a histogram showing a frequency of every intensity level for an input image (an image before transformation), a histogram showing the number of pixels having identical intensity levels is generated. Assuming that a frequency of an intensity level Xn is H(Xn) (n=0, 1, 2, ..., max), the histogram thereof is cumulated. More specifically, a cumulative frequency $\Sigma H(X0)$ for an intensity level X0 is set to H(X0); a cumulative frequency $\Sigma H(X1)$ for an intensity level X1 is obtained by calculation of [H(X0)+H(X1)]; a cumulative frequency $\Sigma H(X2)$ for an intensity level X2 is obtained by calculation of [H(X0)+H(X1)+H(X2)]; and a cumulative frequency $\Sigma H(Xmax)$ for an intensity level Xmax is obtained by calculation of [H(X0)+H(X1)+ ... +H(Xmax)]. As a result of such cumulation, a cumulative histogram is generated. Further, a look up table (hereinafter referred to as "LUT") shown in FIG. 1B is generated by adapting a dynamic range (X'0-X'max) of intensity levels of an output image to a range from the cumulative frequency $\Sigma H(X0)$ for the intensity level X0 to the cumulative frequency $\Sigma H(Xmax)$ for the intensity level Xmax (the vertical axis of the cumulative histogram).

When the intensity levels of the input image are transformed using the LUT generated in this manner, the resultant output image has a uniform frequency (an even distribution) of its intensity levels as shown in a histogram of FIG. 1C and therefore has a more enhanced contrast.

However, when such histogram equalization method is adapted to an input image that has an extreme peak of its intensity frequency, intensity levels near the peak may be transformed into a wider range within the dynamic range of a resultant output image, and therefore a desired result may not be obtained (the resultant image may be indistinct).

In addition, in the conventional gradation correction technique, since human visual characteristics, that is, more particularly, Weber-Fechner's law stating that "human sensation is proportional to the logarithm of stimulus intensity" are not considered, the narrower dynamic range image as a result of the transformation may be indistinct.

SUMMARY OF THE INVENTION

In an embodiment, the present invention provides intensity transformation that can be performed considering both intensity distribution characteristics of input images and the human visual characteristics.

According a first embodiment of the present invention, there is provided an image processing apparatus for correcting a gradation of an input image data, including: a first generating section for generating a first look up table using the input image data; a second generating section for generating a second look up table based upon the first look up table and human visual characteristics; a combining section for generating a third look up table by combining the first and second look up tables according to a predetermined combining ratio; and a transforming section for transforming the image data using the third look up table.

In an embodiment, the first generating section may generate the first look up table based upon a histogram of intensity levels of the image data.

In an embodiment, the second generating section may generate the second look up table using a predetermined logarithm curve as the human visual characteristics.

In an embodiment, the image processing apparatus, preferably, further includes an input section for inputting the combining ratio.

In an embodiment, the image processing apparatus, preferably, further includes a setting section for setting the combining ratio based upon the first and second look up tables.

In an embodiment, the transforming section may transform a dynamic range of the intensity levels of the image data using the third look up table.

According to a second embodiment of the present invention, there is provided an image processing method, wherein an image processing apparatus is used for correcting a gradation of an input image data, the method including the steps of generating a first look up table using the input image data, generating a second look up table based upon the first look up table and human visual characteristics, generating a third look up table by combining the first and second look up tables according to a predetermined combining ratio, and transforming the image data using the third look up table.

According to a third embodiment of the present invention, there is provided a storage medium in which a computer readable program for image processing to correct a gradation of an input image data, the program including the steps of generating a first look up table using the input image data, generating a second look up table based upon the first look up table and human visual characteristics; generating a third look up table by combining the first and second look up table according to a predetermined combining ratio, and transforming the image data using the third look up table.

According to a fourth embodiment of the present invention, there is provided an image processing apparatus for correcting a gradation of an input image data, the apparatus including a first generating section for generating a first look up table using the input image data, a second generating section for generating a second look up table based upon the first look up table and human visual characteristics, and a transforming section for transforming the image data using the second look up table.

In an embodiment, the first generating section may generate the first look up table based upon a histogram of intensity levels of the image data.

In an embodiment, the second generating section may generate the second look up table using a predetermined logarithm curve as the human visual characteristics.

In an embodiment, the transforming section may transform a dynamic range of the intensity levels of the image data using the second look up table.

According to a fifth embodiment of the present invention, there is provided an image processing method of an image processing apparatus for correcting a gradation of an input image data, the method including the steps of generating a first look up table using the input image data, generating a second look up table based upon the first look up table and human visual characteristics, and transforming the image data using the second look up table.

According to a sixth embodiment of the present invention, there is provided a storage medium in which a computer readable program for image processing to correct a gradation of an input image data, the program including the steps of generating a first look up table using the input image data, generating a second look up table based upon the first look up table and human visual characteristics, and transforming the image data using the second look up table.

In the image processing apparatus and method as well as the program according to the first, second, and third embodiment of the present invention, a first look up table that has been generated using input image data and a second look up table that has been generated based upon the first look up table and human visual characteristics are combined according to a predetermined combining ratio to generate a third look up table, and then the image data is transformed using the third look up table, so that it is possible to transform intensity levels with consideration of both the features of distribution of the intensity levels in the input image and the human visual characteristics.

Further, in the image processing apparatus and method as well as the program according to the fourth, fifth, and sixth embodiments of the present invention, a first look up table is generated using input image data, a second look up table is generated based upon the first look up table and human visual characteristics, and then the image data is transformed using the second look up table, so that it is possible to transform intensity levels with consideration of both the features of distribution of the intensity levels in the input image and the human visual characteristics.

Additional features and advantages of the present invention are described in, and will be apparent from, the following Detailed Description of the Invention and the figures.

BRIEF DESCRIPTION OF THE FIGURES

FIG. 9 shows a block diagram of an image processing section in accordance with the principles of the present invention.

DETAILED DESCRIPTION OF THE INVENTION

Figure 2:
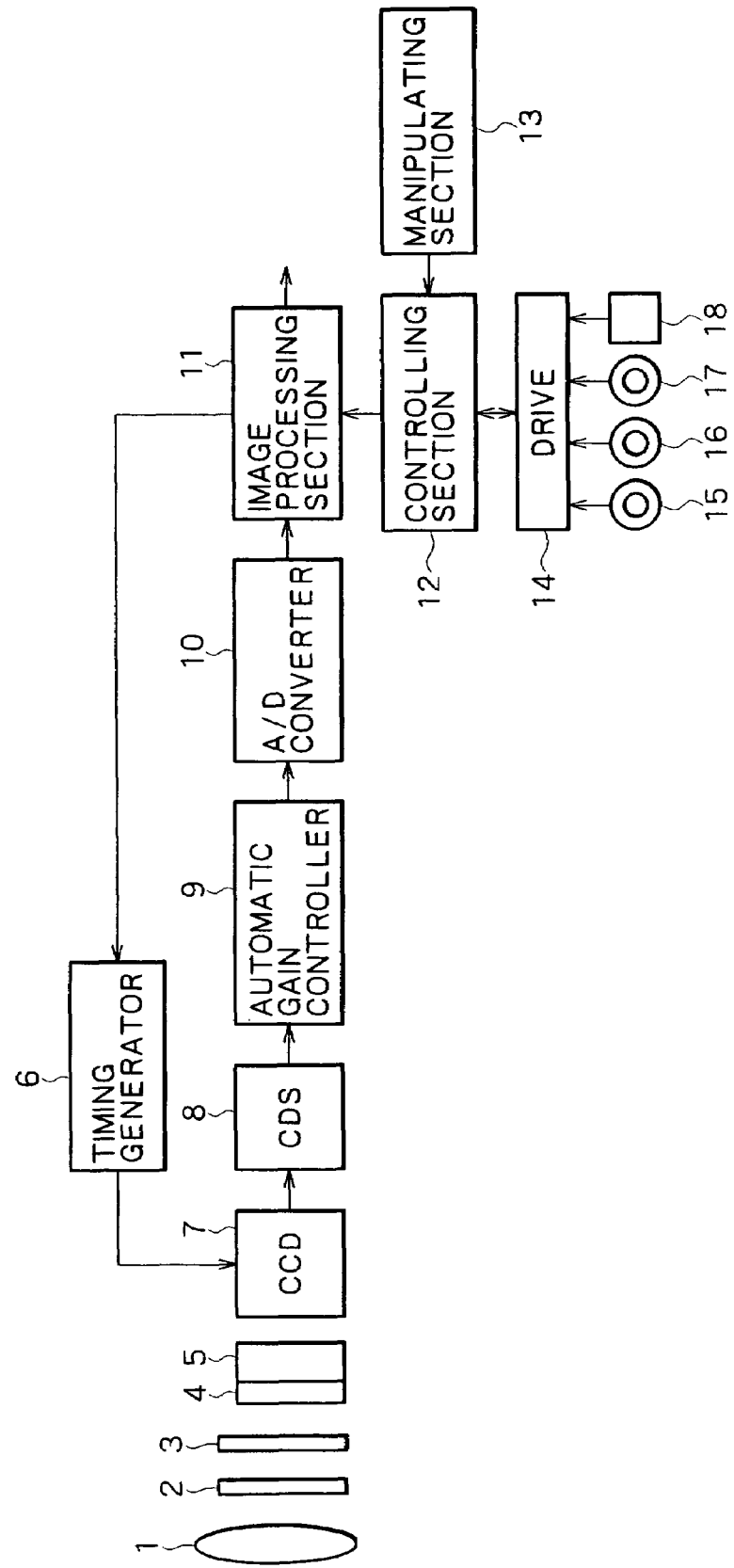
FIG. 2 shows a block diagram of an imaging apparatus in accordance with the principles of the present invention.

FIG. 2 shows an imaging apparatus in accordance with an embodiment of the present invention. Preferably, the imaging apparatus acquires an optical image of an object as wider dynamic range (e.g., 16-bit wide) image data and transforms it into narrower dynamic range (e.g., 8-bit wide) image data appropriately.

In an embodiment, an optical system of the imaging apparatus includes: a lens 1 that collects the optical image of the object; an aperture 2 that adjusts a quantity of light of the optical image; a shutter 3 that adjusts duration of incidence of the optical image; an infrared cutoff filter (IR filter) 4 that filters out light in infrared region to which a CCD 7 is too sensitive; and a low pass filter (LPF) 5 that rejects higher optical frequency components to suppress aliasing as a result of discrete sampling by the CCD 7. It should be noted that the infrared cutoff filter 4 may be omitted by applying a coating for rejecting the infrared region to the lens 1.

Further, the imaging apparatus includes: a timing generator 6 that generates horizontal scanning timing and vertical scanning timing for the CCD 7; the CCD 7 that outputs wider dynamic range image data to a CDS 8 by photoelectrically converting the optical image input via the optical system; the CDS (correlated double sampling) 8 that reduces noise by sampling the image data input from the CCD 7; an AGC (automatic gain controller) 9 that electrically amplifies the amplitude of the image data depending on the brightness of the object; an A/D converter 10 that digitizes the analog image data; an image processing section 11 that comprises a DSP (digital signal processor) and so on and converts the wider dynamic range digital image data into narrower dynamic range digital image data; and a controlling section 12 that controls a drive 14 to read a controlling program stored in a magnetic disk 15, an optical disk 16, a magneto-optical disk, or a semiconductor memory 18 and further controls the entire imaging apparatus based upon the controlling program read through the drive 14, user commands input through a manipulating section 13 and the like.

In the imaging apparatus, the optical image that is input via the optical system including a series of components from the lens 1 to the low pass filter 5 is converted into the wider dynamic range image data by the CCD 7, undergoes the noise reduction process by the CDS 8 and the amplitude amplification by the AGC 9, and is further digitized by the A/D converter 10 and input into the image processing section 11. The Wider dynamic range digital image data that is input into the image processing section 11 is transformed into the narrower dynamic range digital image data.

Figure 1A:
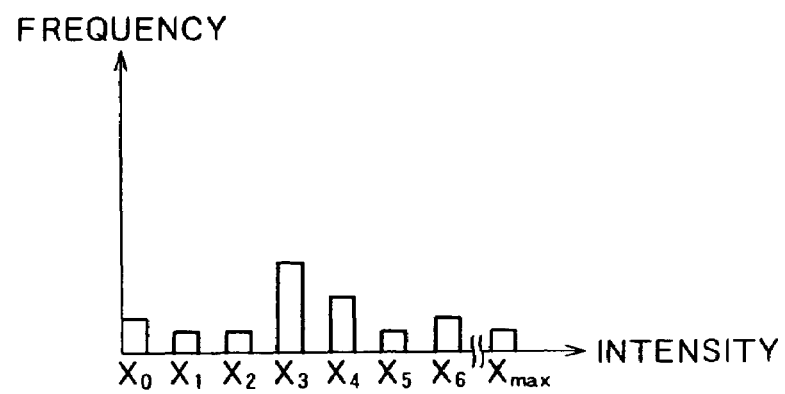
FIGS. 1A through 1C show diagrams illustrating a histogram equalization method.
Figure 1B:
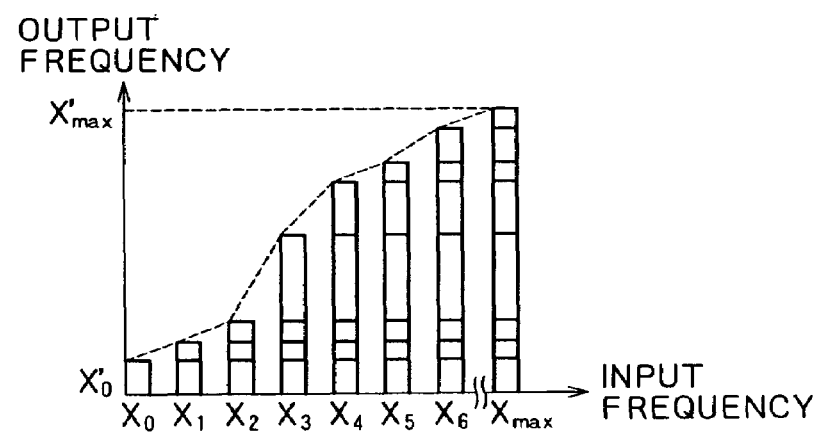
Figure 1C:
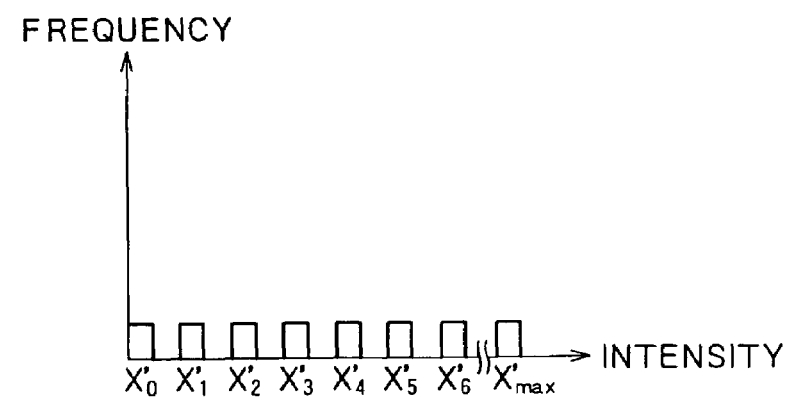
Figure 3:
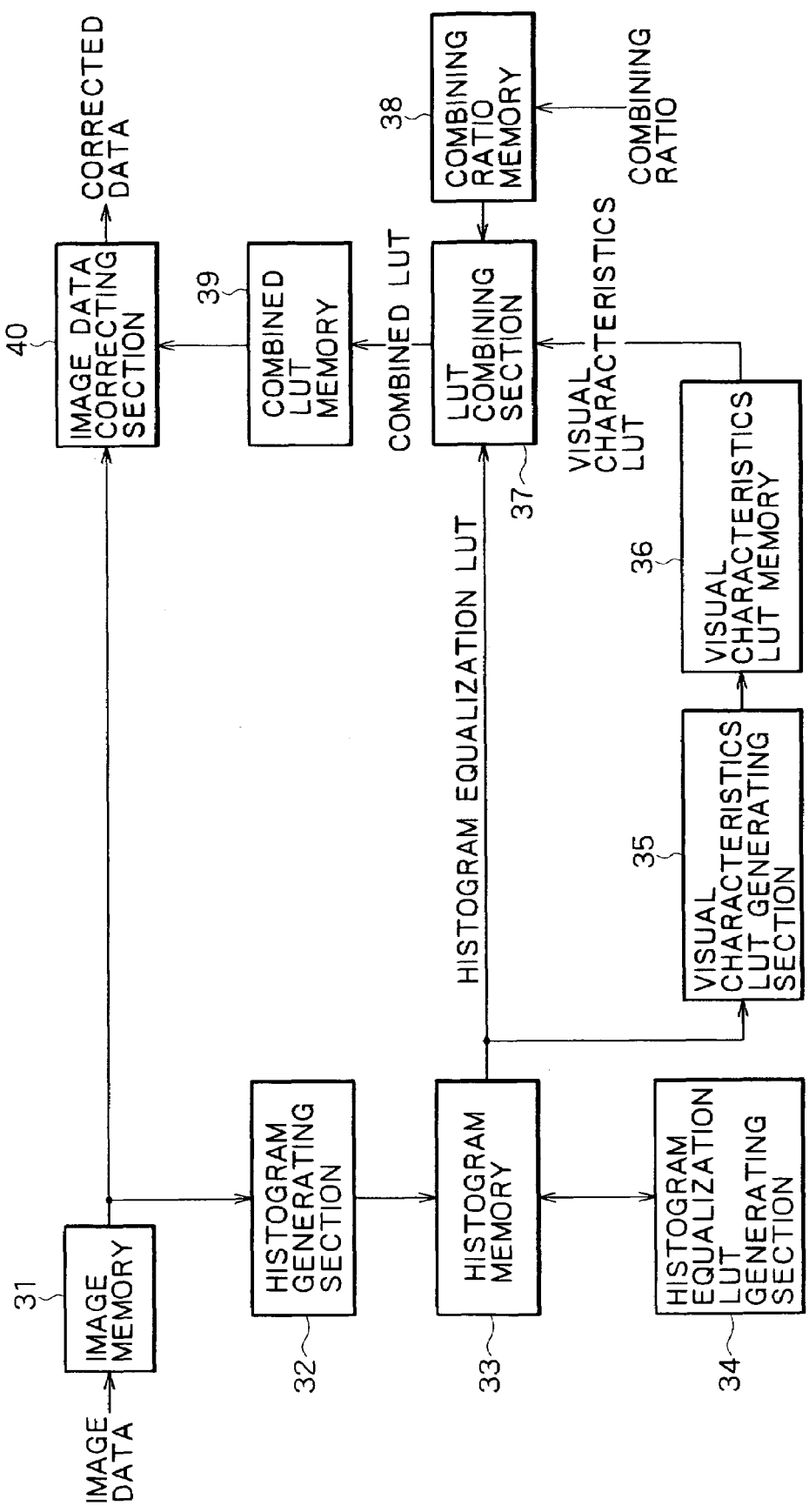
FIG. 3 shows a block diagram of an image processing section in accordance with the principles of the present invention.

FIG. 3 shows an embodiment of image processing section 11 (see FIG. 2). Preferably, an image memory 31 stores the wider dynamic range digital image data input from the A/D converter 10. A histogram generating section 32 generates a histogram showing distribution of intensity levels in the image data read from the image memory 31 and stores it in a histogram memory 33. A histogram equalization LUT generating section 34 calculates a cumulative histogram by cumulating the histogram read from the histogram memory 33 in a manner similar to the process for generating a LUT of FIG. 1B from a histogram of FIG. 1A, and further adapts a narrower dynamic range to the vertical axis of the cumulative histogram in order to generate a histogram equalization LUT and store it in the histogram memory 33.

A visual characteristics LUT generating section 35, referring to the histogram equalization LUT stored in the histogram memory 33, generates another LUT with consideration of human visual characteristics (hereinafter referred to as a "visual characteristics LUT") and stores it in a visual characteristics memory 36. The human visual characteristics and the process for generating the visual characteristics LUT will be described in detail later.

A LUT combining section 37 combines the histogram equalization LUT read from the histogram memory 33 and the visual characteristics LUT read from the visual characteristics LUT memory 36 according to a combining ratio read from a combining ratio memory 38 and stores the resultant combined LUT in a combined LUT memory 39. Preferably, the combining ratio memory 38 stores the combining ratio that has been set by the user using the manipulating section 13.

An image data correction section 40 transforms intensity levels of the wider dynamic range image data read from the image memory 31 using the combined LUT read from the combined LUT memory 39 and outputs the resultant narrower dynamic range image data as corrected data.

Figure 4:
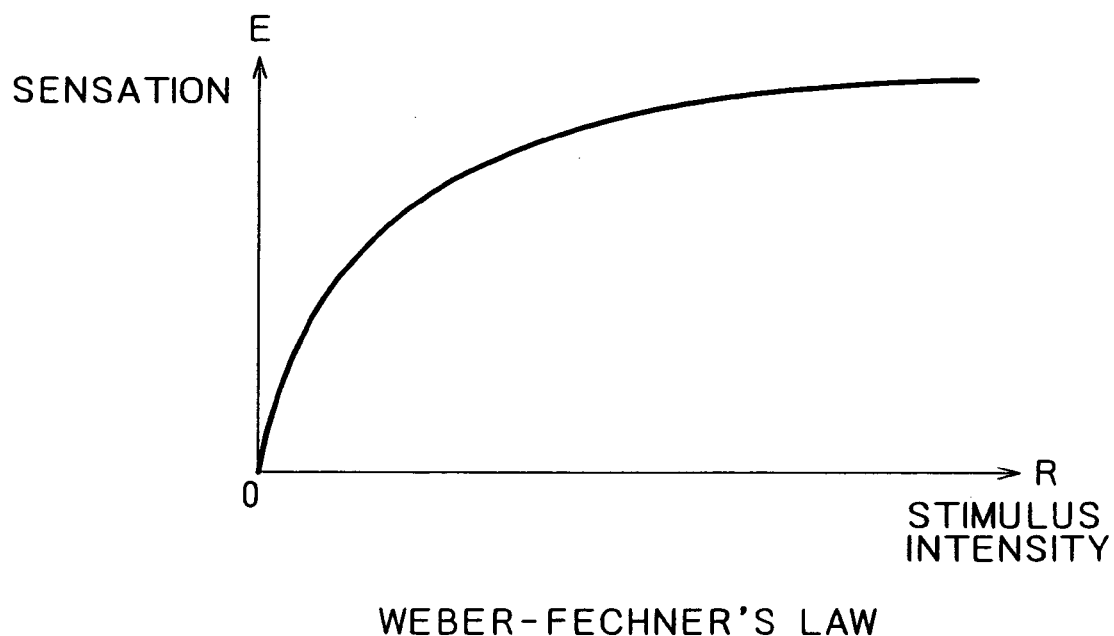
FIG. 4 shows a diagram illustrating Weber-Fechner's law.

FIG. 4 shows a diagram illustrating Weber-Fechner's law. Weber-Fechner's law states that "human sensation is proportional to the logarithm of stimulus intensity." That is, assuming that the stimulus intensity is R and the sensation is E, the following relational expression is established:

Sensation E=K*log R where K is a predetermined constant.

Figure 5:
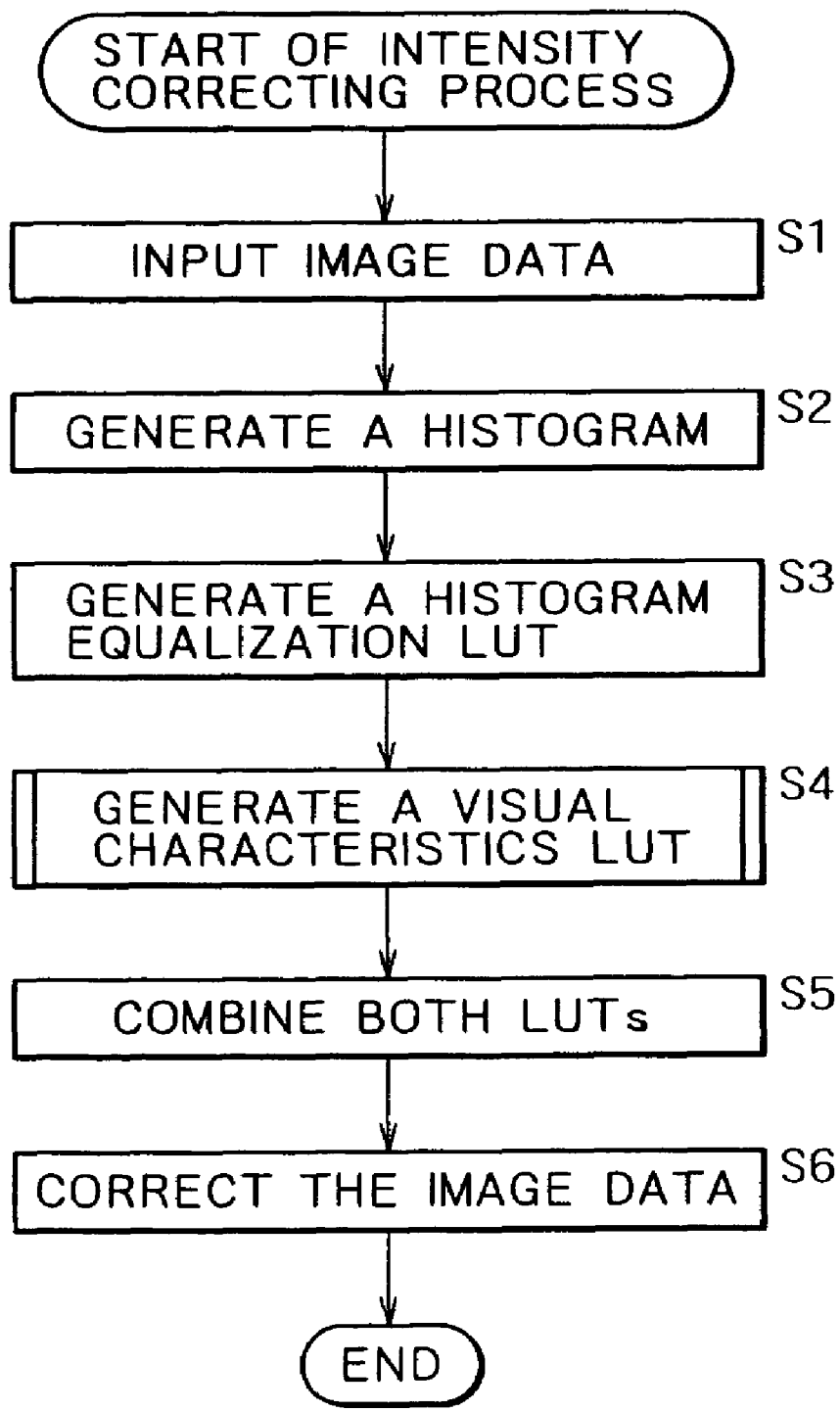
FIG. 5 shows a flow chart describing an operation of an image processing section in accordance with the principles of the present invention.

FIG. 5 shows a flow chart describing an operation of an imaging processing section 11 (see FIG. 3) in accordance with an embodiment of the present invention. In Step S1, wider dynamic range digital image data is input from the A/D converter 10 (see FIG. 2) to the image processing section 11. The input image data is stored in the image memory 31. In Step S2, the histogram generating section 32 reads the image data from the image memory 31 and generates a histogram of the image data's intensity levels and stores it in the histogram memory 33. In Step S3, the histogram equalization LUT generating section 34 reads the histogram from the histogram memory 33 to calculate a cumulative LUT, and then generates a histogram equalization LUT by adapting a narrower dynamic range to the vertical axis of the cumulative histogram and stores it in the histogram memory 33.

Figure 6:
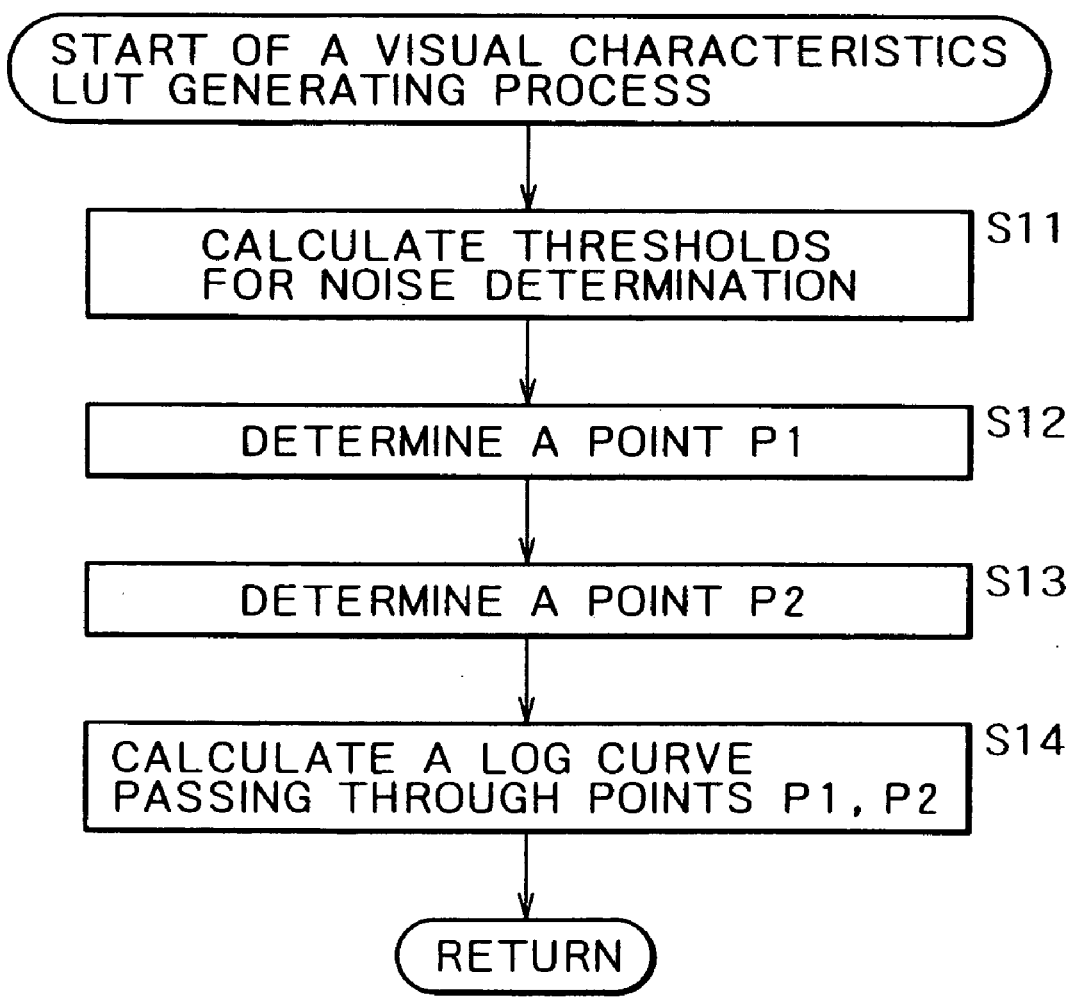
FIG. 6 shows a flow chart illustrating a process for generating a visual characteristics LUT in Step S4 of FIG. 5.
Figure 7:
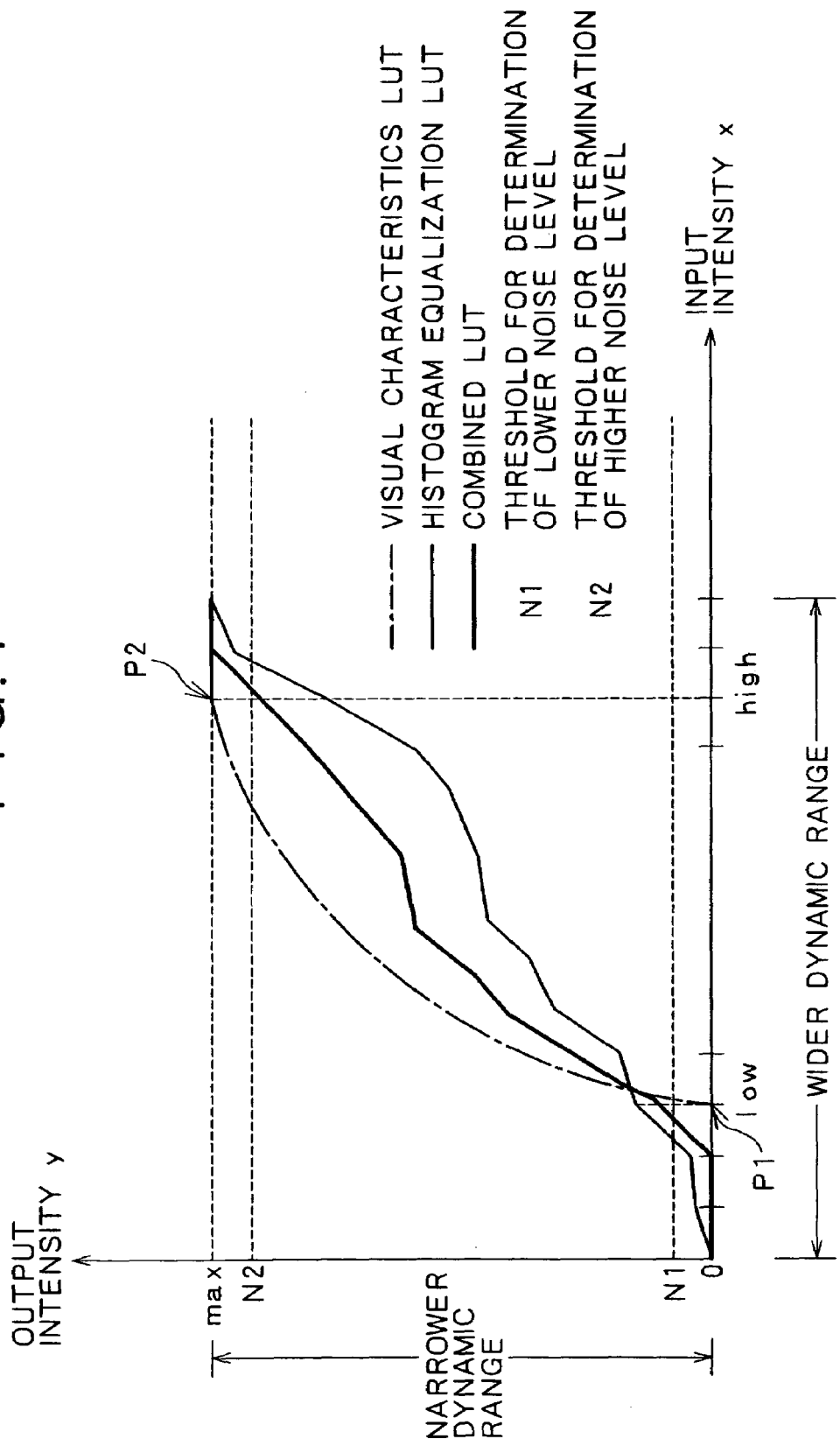
FIG. 7 shows a diagram illustrating a process for generating a combined LUT.

In Step S4, the visual characteristics LUT generating section 35 generates a visual characteristics LUT by referring to the histogram equalization LUT stored in the histogram memory 33 and stores it in the visual characteristics memory 36. A process for generating the visual characteristics LUT will be described with reference to the flow chart of FIG. 6 as well as FIG. 7. It is noted that FIG. 7 shows a curve for the histogram equalization LUT, a curve for the visual characteristics LUT and a curve for the combined LUT.

In Step S11, the visual characteristics LUT generating section 35 sets two thresholds N1, N2 for determination higher and lower noise levels for the narrower dynamic range. The thresholds may be set, for example, based upon the shape of the curve of the histogram equalization LUT (the cumulative histogram), or it may be set to any predetermined fixed value, or it may be also set by the user.

In Step S12, the visual characteristics LUT generating section 35 determines for the histogram equalization LUT the minimum value "low" that is the lowest value in the wider dynamic range that corresponds to the values higher than the threshold for the lower noise level N1 in the narrower dynamic range, and determines a point which value is "low" in the wider dynamic range and the minimum ("zero") in the narrower dynamic range as P1.

In Step S13, the visual characteristics LUT generating section 35 determines for the histogram equalization LUT the maximum value "high" that is the highest value in the wider dynamic range that corresponds to the values lower than the threshold for the higher noise level N2 in the narrower dynamic range, and determines a point which value is "high" in the wider dynamic range and the maximum ("max") in the narrower dynamic range as P2.

In Step S14, the visual characteristics LUT generating section 35 calculates a logarithm curve y that passes through the points P1, P2 as the visual characteristics LUT:

$$y=a*\log(x)+b$$

where x, y designate values of the input intensity (the horizontal axis) and the output intensity (the vertical axis), respectively.

Now, referring back to FIG. 5, in Step S5, the LUT combining section 37 reads the histogram equalization LUT (hereinafter also referred to as LUT1($x$)) from the histogram memory 33, reads the visual characteristics LUT (hereinafter also referred to as LUT2($x$)) from the visual characteristics LUT memory 36, reads the combining ratio from the combining ratio memory 38, and then calculates a combined LUT (hereinafter also referred to as LUT3($x$)) according to the following expressions and stores it in the combined LUT memory 39:

$$LUT3(x)=0 \ (0<x<\text{low})$$

$$LUT3(x)=\alpha*LUT1(x)+(1-\alpha)*LUT2(x) \ (\text{low}\leq x\leq\text{high})$$

$$LUT3(x)=\max \ (\text{high}<x\leq\max)$$

In Step S6, the image data correcting section 40 reads the wider dynamic range digital image data from the image memory 31, transforms the intensity levels of the wider dynamic range digital image data using the combined LUT read from the combined LUT memory 39 and outputs the resultant narrower dynamic range image data as the corrected data.

As described above, in the image processing section 11, the wider dynamic range digital data is transformed into the narrower dynamic range digital image data by using the combined LUT into which the histogram equalization LUT based upon the histogram of the intensity levels of the wider dynamic range image data and the visual characteristics LUT with consideration of the-human visual characteristics are combined.

Figure 8:
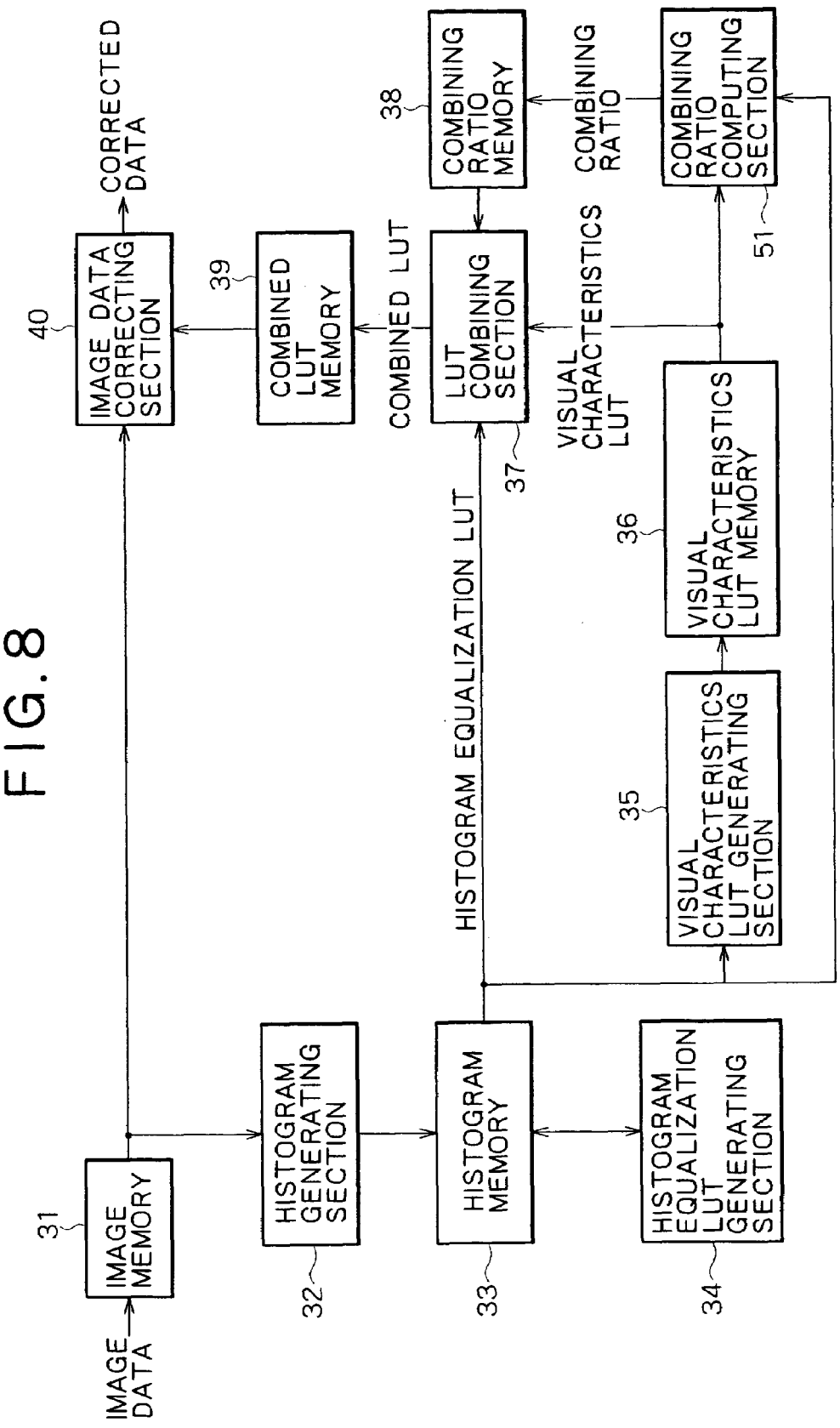
FIG. 8 shows a block diagram of an image processing section in accordance with the principles of the present invention.

FIG. 8 shows another embodiment image processing section 11. Preferably, a combining ratio computing section 51 has been added to the image processing section 11, wherein the combining ratio computing section 51 computes the combining ratio by analyzing features of the histogram equalization LUT read from the histogram memory 33 and the visual characteristics LUT read from the visual characteristics LUT memory 36 and stores it in the combining ratio memory 38.

The operation of this embodiment of the image processing section 11 is similar to the image processing station shown in FIG. 3, except that a process for computing the combining ratio by the combining ratio computing section 51 is added to the process described with reference to the flow chart of FIG. 5 between the process of Step 4 (the process for generating the visual characteristics LUT) and the process of Step 5 (the process for combining both LUTs), and therefore its description is omitted.

FIG. 9 shows another embodiment of the image processing section 11. Preferably, the LUT combining section 37, the combining ratio memory 38, and the combined LUT memory 39 have been deleted from the image processing section shown in FIG. 3.

Preferably, the image correcting section 40 transforms the intensity levels of the wider dynamic range image data using the visual characteristics LUT read from the visual characteristics LUT memory 36 to acquire the narrower dynamic range image data.

In an embodiment, it is also possible to apply the present invention to the case in which the intensity levels are altered without alteration of the dynamic range of images.

In an embodiment, it is also possible to apply the present invention not only to the imaging apparatus in the embodiments described above, but also to other electronic apparatuses that process image data, such as scanners, facsimile machines, copying machines and the like.

A series of the above-described processes may be performed by hardware, though it also may be performed by software in further embodiments of the present invention. Preferably, when the series of the processes is performed by software, a program constituting the software and stored in a storage medium shall be installed in a computer incorporated in dedicated hardware, or in any other computer that can perform various functions by installing various programs, such as, for example, a general-purpose personal computer and the like.

The storage medium may, as shown in FIG. 2, include package media that may include magnetic disks 15 (including floppy disks), optical disks 16 (including CD-ROM (compact disk read only memory) and DVD (digital versatile disks)), magneto-optical disks 17 (including MD (Mini Discs)), or semiconductor memory 18 and the like, in which the program is stored and which are supplied to provide the user with the program, or otherwise it may include ROM or hard disk drives, in which the program is stored and which is supplied to the user, being pre-installed in the computer.

In this specification, it should be noted that the steps describing the program stored in the storage medium may include not only the processes that are performed chronologically in the order in which they have been described, but also the processes that are performed not always chronologically, but in parallel or independently.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An image processing apparatus for correcting a gradation of input image data, comprising:
   a first generating section for generating a first look up table using the input image data;
   a second generating section for generating a second look up table based on the first look up table and human visual characteristics, wherein the human visual characteristics are generated by setting a low point and a high point on an output intensity versus input intensity graph and a logarithm curve is calculated between the high and low points; and
   a transforming section for transforming the image data using the second look up table, wherein the first generating section generates the first look up table based on a cumulative histogram of intensity levels of the image data.

2. An image processing apparatus as claimed in claim 1, wherein the second generating section generates the second look up table using a predetermined logarithm curve as the human visual characteristics.

3. An image processing apparatus as claimed in claim 1, wherein the transforming section transform a dynamic range of the intensity levels of the image data using the second look up table.

4. An image processing method of an image processing apparatus for correcting a gradation of input image data, the method comprising the steps of:
   generating a first look up table using the input image data, wherein the input image data is for a wider dynamic range image;
   generating a second look up table based on the first look up table and human visual characteristics, wherein the human visual characteristics are generated by setting a low point and a high point on an output intensity versus input intensity graph and a logarithm curve is calculated between the high and low points; and
   transforming the image data using the second look up table to produce a narrower dynamic range image.

5. An image processing method as claimed in claim 4, wherein the first generating step generates the first look up table based on a histogram of intensity levels of the image data.

6. An image processing method as claimed in claim 4, wherein the second generating step generates the second look up table using a predetermined logarithm curve as the human visual characteristics.

7. An image processing method as claimed in claim 4, wherein the transforming step transforms a dynamic range of the intensity levels of the image data using the second look up table.

8. A storage medium for storing a computer readable program for image processing to correct a gradation of input image data, the program comprising:
   a first generating step of generating a first look up table using the input image data;
   a second generating step of generating a second look up table based on the first look up table and human visual characteristics, wherein the second generating step generates the second look up table using a predetermined logarithm curve as the human visual characteristics and the logarithm curve is determined by setting a low point and a high point on an output intensity versus input intensity graph; and a transforming step of transforming the image data using the second look up table.

9. A storage medium as claimed in claim 8, wherein the first generating step generates the first look up table based on a histogram of intensity levels of the image data.

10. A storage medium as claimed in claim 8, wherein the transforming step transforms a dynamic range of the intensity levels of the image data using the second look up table.

11. A storage medium for storing a computer readable program for image processing to correct a gradation of input image data, the program comprising:

a first generating step of generating a first look up table using the input image data;

a second generating step of generating a second look up table based on the first look up table and human visual characteristics, wherein the second generating step generates the second look up table using a predetermined logarithm curve as the human visual characteristics; and a transforming step of transforming the image data using the second look up table;

wherein:

the predetermined logarithm curve passes through a first point and a second point on a graph of an input intensity versus an output intensity;

the first point being at zero for the output intensity and a low value for the input intensity, the low value being a lowest value in a wider dynamic range that corresponds in the first look up table to a value higher than a lower noise threshold; and the second point being at a maximum value in the first look up table for the output intensity and a high value for the input intensity, the high value being a highest value in a wider dynamic range that corresponds in the first look up table to a value lower than a higher noise threshold.

* * * * *